(12) United States Patent
Wille

(10) Patent No.: US 8,197,130 B2
(45) Date of Patent: Jun. 12, 2012

(54) METHOD TO ACCURATELY READ TEMPERATURE FOR A ROOM SENSOR APPARATUS

(75) Inventor: James P. Wille, Des Plaines, IL (US)

(73) Assignee: Siemens Industry, Inc, Alpharetta, GA (US)

(*) Notice: Subject to any disclaimer, the term of this patent is extended or adjusted under 35 U.S.C. 154(b) by 479 days.

(21) Appl. No.: 12/498,423

(22) Filed: Jul. 7, 2009

(65) Prior Publication Data

US 2010/0020849 A1 Jan. 28, 2010

Related U.S. Application Data

(60) Provisional application No. 61/078,881, filed on Jul. 8, 2008.

(51) Int. Cl.
*G01K 13/00* (2006.01)
*G01K 7/00* (2006.01)
*G01K 1/00* (2006.01)

(52) U.S. Cl. ......... 374/138; 374/135; 374/163; 374/208
(58) Field of Classification Search .................. 374/208, 374/163, 135, 138
See application file for complete search history.

(56) References Cited

U.S. PATENT DOCUMENTS

| | | | |
|---|---|---|---|
| 5,008,775 A | 4/1991 | Heinen | |
| 6,032,867 A * | 3/2000 | Dushane et al. | 236/51 |
| 6,082,894 A * | 7/2000 | Batko et al. | 374/142 |
| 6,293,697 B1 * | 9/2001 | Gul | 374/135 |
| 6,347,747 B1 * | 2/2002 | Nesbitt | 236/78 D |
| 7,900,464 B2 * | 3/2011 | Aoki et al. | 62/176.6 |
| 2002/0080852 A1 | 6/2002 | Mirov | |

* cited by examiner

*Primary Examiner* — Lisa Caputo
*Assistant Examiner* — Mirellys Jagan

(57) ABSTRACT

A temperature sensing device enclosed in a housing having at least one thermally isolative wall and machined slot for isolating the temperature sensing device to ensure accurate reading of ambient temperature in room.

14 Claims, 5 Drawing Sheets

US 8,197,130 B2

METHOD TO ACCURATELY READ TEMPERATURE FOR A ROOM SENSOR APPARATUS

CROSS REFERENCE OF RELATED APPLICATIONS

This patent claims the priority benefit under 35 U.S.C. §119(e) of U.S. provisional patent application Ser. No. 61/078,881, submitted on Jul. 8, 2008; the content of which is hereby incorporated by reference for all purposes.

FIELD

The present invention generally relates to temperature sensing devices used to measure the temperature of the ambient air in a room or particular space. More specifically, the present invention relates to a method and apparatus to accurately read such ambient temperature for monitoring room temperature for building automation climate control systems.

BACKGROUND

Building automation climate control systems which include heating, ventilating, and air conditioning (HVAC) systems, have at least one thermostat to monitor the ambient air temperature within a room of a building to provide feedback as to whether the air temperature of the room needs to be altered to satisfy a pre-set point. The thermostat is arranged so that a temperature sensing element is housed within an enclosure to sense the temperature of the air passing over, through, or in contact with the enclosure. The building automation climate control system may then compare this air temperature to the pre-set point to determine if the air temperature of the room needs to be changed to satisfy the pre-set point. In general, the temperature sensing element is interconnected with a processor circuit to accomplish this function. The temperature sensing element can be either indirectly coupled or directly secured to the processor circuit which includes a plurality of interconnecting members (or conductive wires). The processor circuit is coupled to the housing and is enclosed therein.

In addition to the temperature sensing device, there are other components within the mounting enclosure that generate heat. Due to the heat transfer of these components, the thermal readings made at the sensing element may not be accurate of the ambient room temperature. Therefore, there may be substantial differences between the air temperature measured by the thermostat and the actual ambient air temperature of the room. In this situation, the climate control system may perform inefficiently because the temperature measured by the thermostat may not be the accurate ambient air temperature of the room. Therefore, a need exists for a device and method to accurately read the ambient temperature of a room by a temperature sensing device.

SUMMARY OF INVENTION

It is one object of the present invention to provide, a temperature sensing device for measuring ambient temperature in a room, comprising: a temperature sensing element affixed to a printed circuit board; an enclosure surrounding the temperature sensing element; and a plurality of venting slots to allow ambient temperature air to flow through a sensor channel to the temperature sensing element.

It is another object of the invention to provide, a method to accurately read temperature for a room sensor apparatus comprising the steps of: providing a temperature sensing element affixed to a printed circuit board; providing an enclosure housing the temperature sensing element; isolating the temperature sensing element from the heat producing components with at least one thermally isolative wall; and allowing ambient air to flow freely in the enclosure using venting slots.

BRIEF DESCRIPTION OF DRAWINGS

FIG. 1 b) shows a perspective view from the bottom looking up of the room sensor housing with its external and internal components

DETAILED DESCRIPTION

Figure 1:
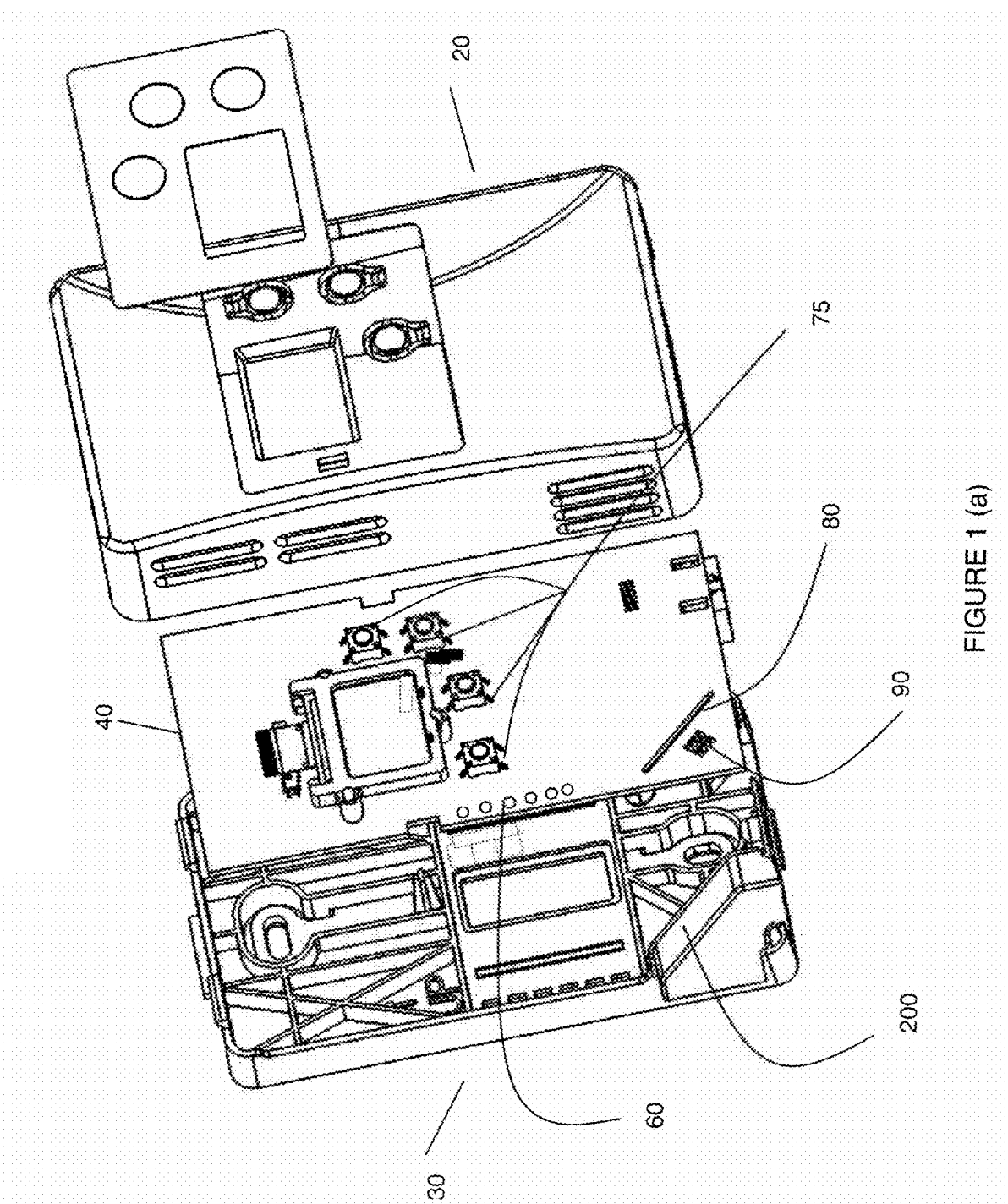
FIG. 1 a) shows a perspective view from the top looking down of the room sensor housing with its external and internal components.
Figure 1:
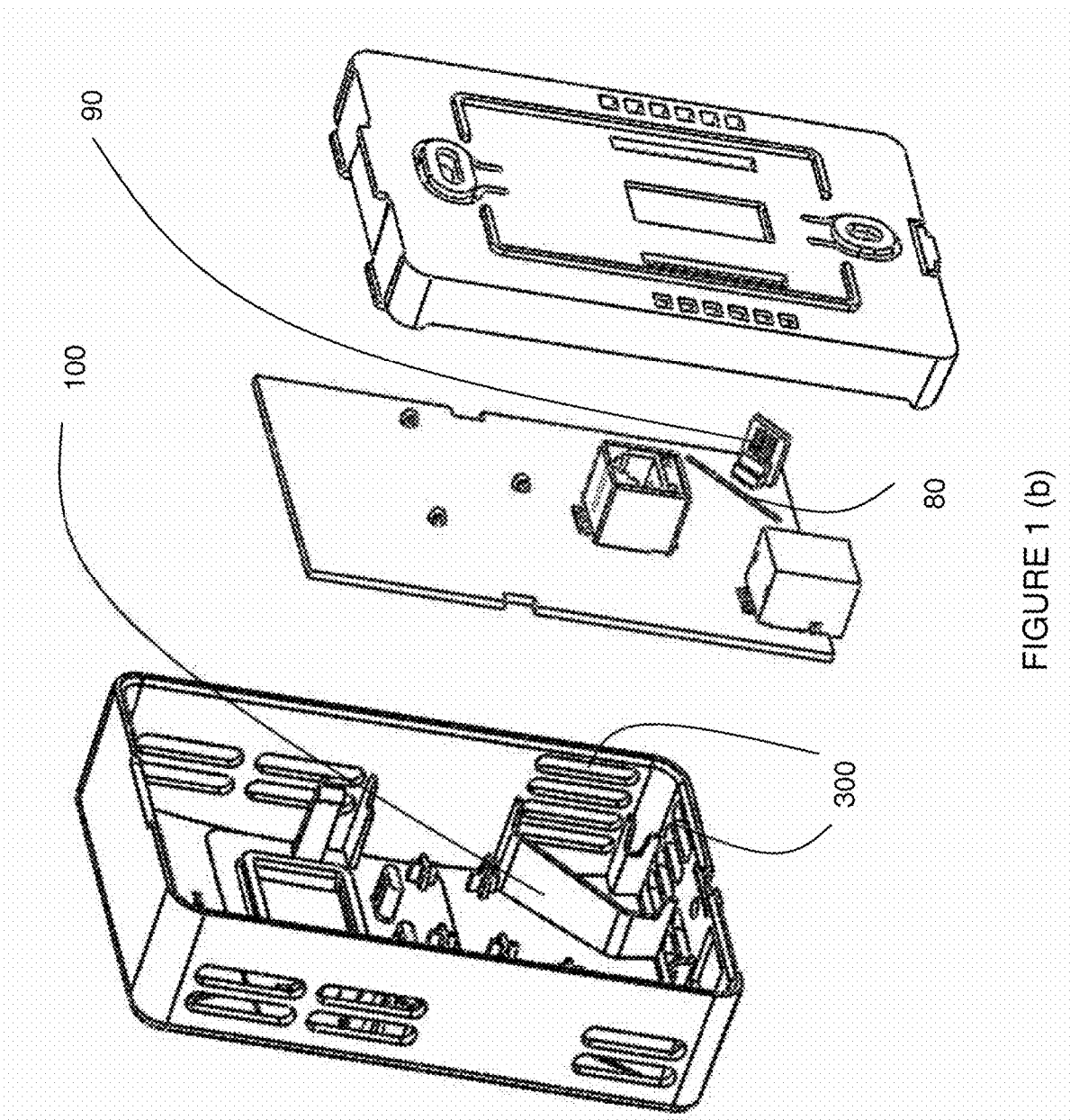

In FIGS. 1 a) and 1 b), enclosure 10 comprises top cover 20 and base 30. Printed circuit board 40 is housed within enclosure 10. Printed circuit board 40 also comprises display panel 50, connector header 60 for wiring to other devices in the building, phone jack 70 to connect to a field device (i.e., laptop) for immediate information, up to four tactile switches 75 and temperature sensor 90. The active components of the printed circuit board 40 generate nearly 1 watt of heat, therefore it is important to separate that heat from the temperature sensor 90. Typically this is achieved through distance; the further away the temperature sensor 90 is from the internal heat of the printed circuit board 40, the less affected the temperature reading will be from the internal heat given off by the printed circuit board 40.

In the present invention, distance is also employed; however conductive and convective barriers are included to further increase the accuracy of temperature sensor 90. Top cover 20 comprises top thermally isolating wall 100 and base 30 comprises bottom thermally isolating wall 200 each molded into both the top cover 20 and base 30 respectively to prevent the convective heat transfer from the components of the printed circuit board 40 through the air to the temperature sensor 90. The printed circuit board 40 also includes a machined slot 80 that essentially locates the temperature sensor 90 on an island. The machined slot 80 forces the heat given off by the components of the printed circuit board 40 to flow around machined slot 80 which increases the distance that the heat must conduct along, thereby limiting the heat transferred to the sensor. This limits the false thermal readings due to the conductive heat transfer of the components of the printed circuit board 40 through the copper on the printed circuit board 40. The heat is easily transferred through the copper and printed circuit board 40 itself, however, in the present invention, the isolation described above does not allow the heat to conduct too close to the temperature sensor 90.

After the top cover 20 and base 30 are fastened together, the top thermally isolating wall 100 and bottom thermally isolating wall 200 touch both the top and bottom surfaces of the printed circuit board 40 so that the air surrounding the temperature sensor 90 is completely isolated from the air surrounding the rest of the printed circuit board 40. The machined slot 80 is just inside of this isolated space so there is no tolerance issue of having the top cover 20, base 30 and machined slot 80 all having to meet at the exact same location. It should also be noted, that a wide assortment of temperature sensors 90 may be used in the present invention.

Figure 2:
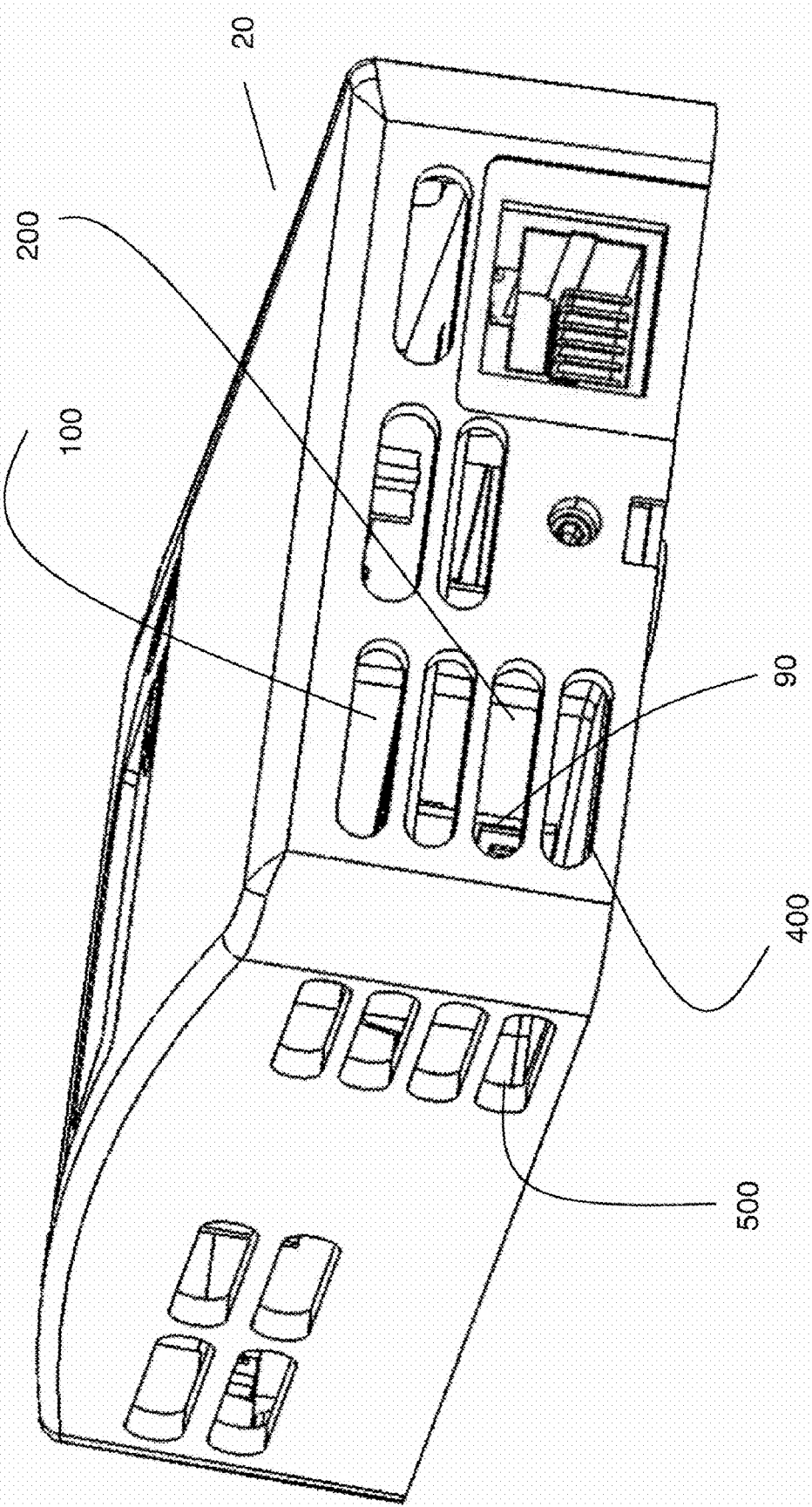
FIG. 2 shows side view of top cover of housing with vent slots.
Figure 3:
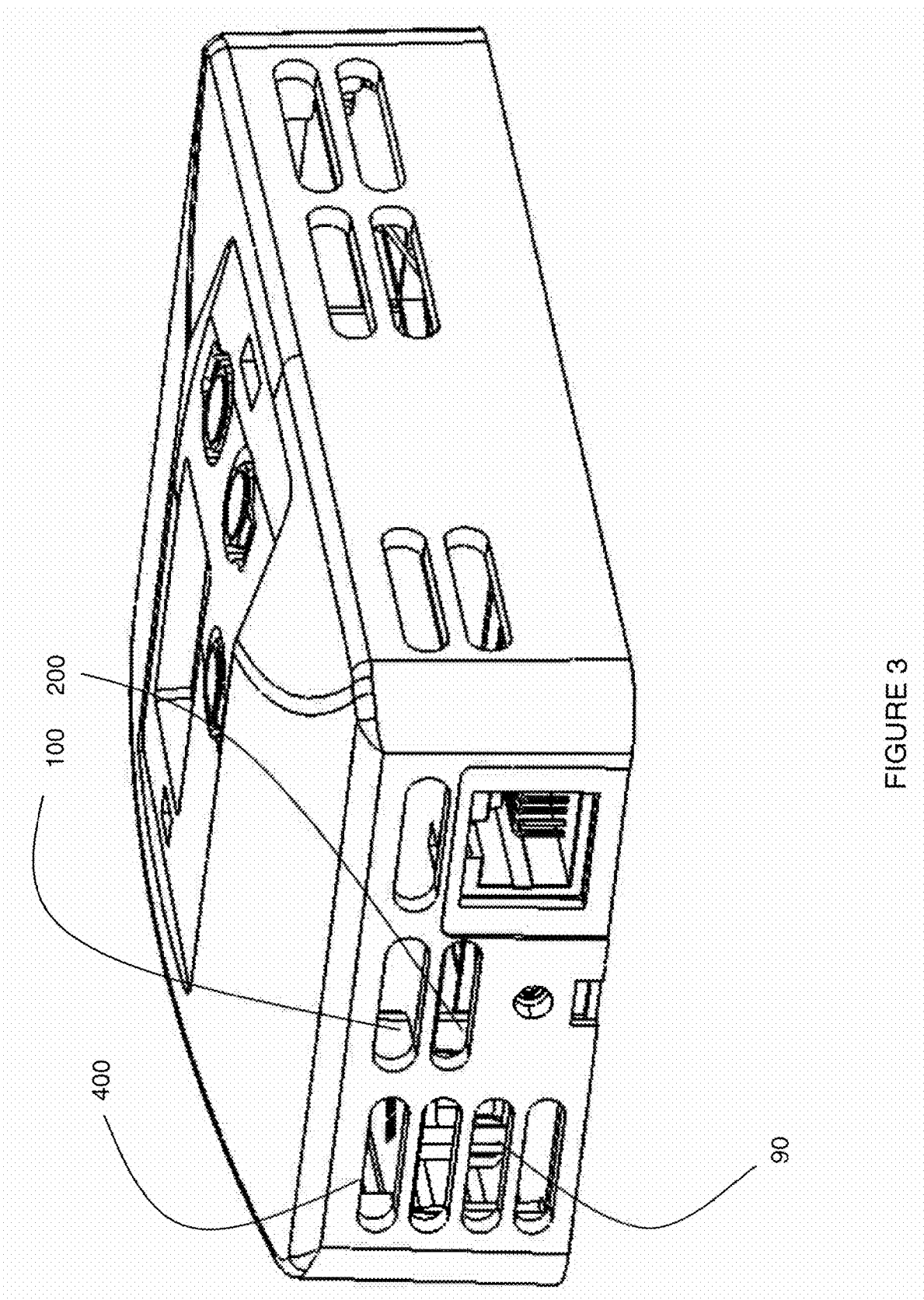
FIG. 3 shows another side view of top cover of housing with vent slots.

FIGS. 2 and 3 show venting slots 300 located around the top cover 30. The venting slots comprise inlet slots 400 and outlet slots 500 to allow ambient air to flow through enclosure 10 and across temperature sensor 90. The sensor channel 600 (shown in FIG. 4) includes the path of the ambient air entering the inlet slots 400 and exiting through the outlet slots 500. The air moves in and out of the sensor channel 600 by means of natural convection. Natural convection is the movement of air due to the temperature gradient caused by the internal components that generate heat. Hot air rises, therefore, the heat generated by the components causes an upward flow of air across the components and also up and along the wall of the room. This air flow will draw the unheated, room ambient air from below the enclosure 10 to enter the top cover 20 at the inlet slots 400 and naturally flow upward. The 45° degree angled top thermally isolating wall 100 and bottom thermally isolating wall 200 direct the air to flow up and out the side of top cover 20. Although the temperature sensor 90 is completely isolated from the other internal components within the enclosure 10, it is heavily vented to allow room ambient air to freely pass through the sensor channel. The 45° angle of the machined slot 80 and top and bottom thermally isolating walls 100 and 200 respectively allow the room air to more easily flow through the sensor channel. The venting slots 300 require a large enough cumulative opening to allow the naturally convective air to move freely in and out of the sensor channel 600.

Figure 4:
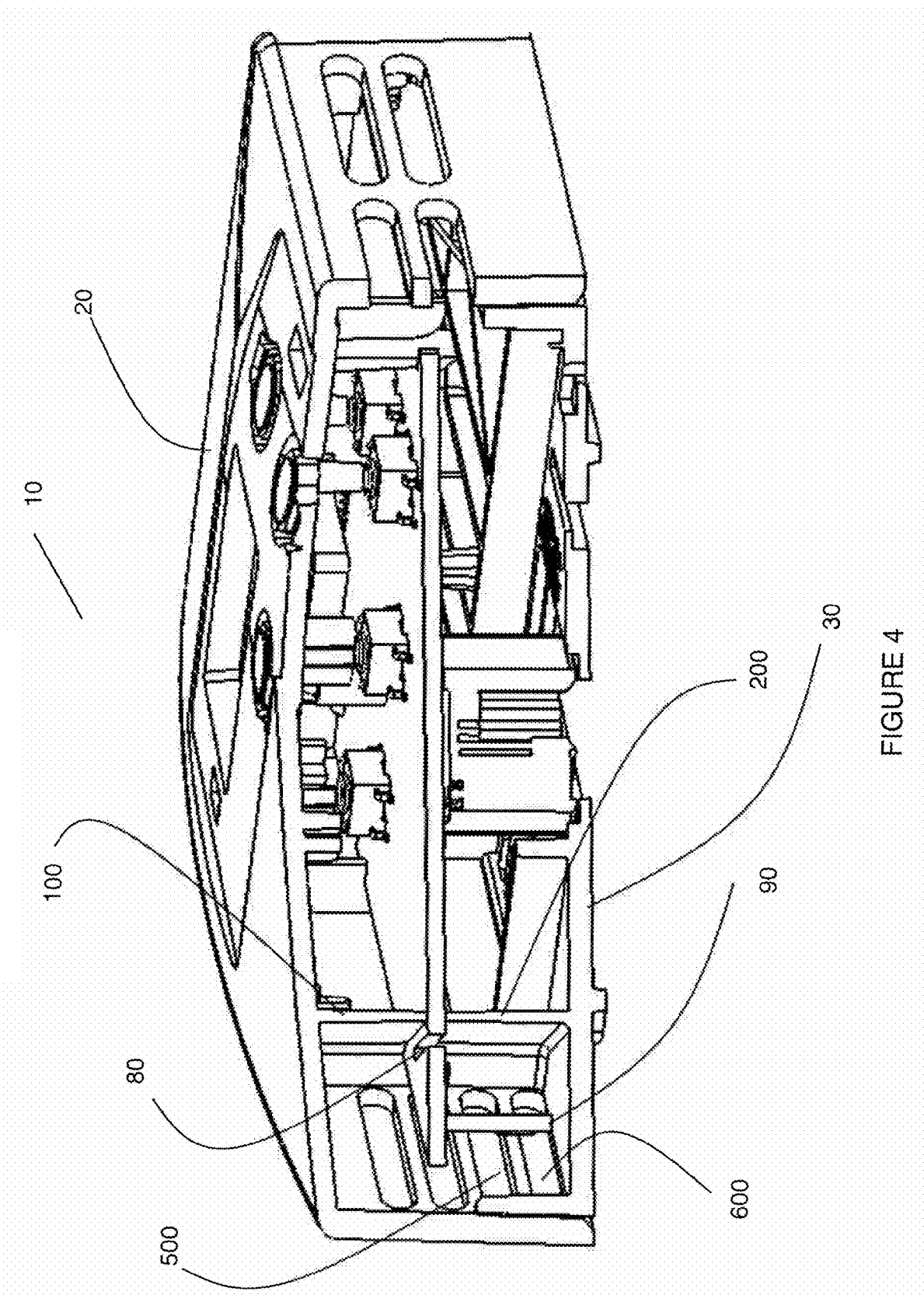
FIG. 4 shows a cross section view of the sensor channel of which the ambient air flows through to reach the temperature sensing element.

FIG. 4 shows a cross section view of the sensor channel 600. As mentioned above, sensor channel 600 represents the path of air that enters through inlet slots 400 and then exits through outlet slots 500 flowing over temperature sensor 90.

While the foregoing description and drawings represent the preferred embodiments of the present invention, it will be apparent to those skilled in the art that various changes and modifications may be made therein without departing from the true spirit and scope of the present invention.

The invention claimed is:

1. A temperature sensing device for measuring ambient temperature in a room, comprising:
   a temperature sensing element;
   a printed circuit board configured to carry the temperature sensing element, wherein the printed circuit board includes a slot configured to substantially isolate the temperature sensing element;
   an enclosure configured to accept and carry the printed circuit board
   an isolating wall connected with and positioned within the enclosure, the isolating wall configured to cooperate with the slot and substantially isolate the temperature sensing element; and
   a plurality of venting slots formed in the enclosure to allow an ambient temperature air to flow through a sensor channel defined between the isolating wall and the enclosure and across the temperature sensing element.

2. The temperature sensing device of claim 1, wherein the isolating wall is a convective barrier.

3. The temperature sensing device of claim 1, wherein the slot and the temperature sensing element are positioned within the sensor channel.

4. The temperature sensing device of claim 1, wherein the slot is oriented at a 45 degree angle relative to a sidewall of the enclosure.

5. The temperature sensing device of claim 1, wherein the enclosure comprises a top cover and a base configured to house the printed circuit board and substantially protect the temperature sensing element.

6. The temperature sensing device of claim 5, wherein the isolating wall is a molded portion of the top cover.

7. The temperature sensing device of claim 1, wherein the slot is a conductive barrier.

8. The temperature sensing device of claim 7, wherein the conductive barrier establishes a conductive path to decrease the heat transfer between the printed circuit board and the temperature sensing element.

9. A method to accurately read temperature for a room sensor apparatus comprising:
   providing a temperature sensing element;
   arranging a printed circuit board to carry the temperature sensing element, wherein the printed circuit board includes a slot configured to substantially isolate the temperature sensing element;
   providing an enclosure to accept and carry the printed circuit board
   establishing an isolating wall within the enclosure to cooperate with the slot and substantially isolate the temperature sensing element; and
   defining a plurality of venting slots in the enclosure to allow an ambient temperature air to flow through a sensor channel defined between the isolating wall and the enclosure and across the temperature sensing element.

10. The method to accurately read temperature for a room sensor apparatus of claim 9, wherein the isolating wall is a convective barrier.

11. The method to accurately read temperature for a room sensor apparatus of claim 9, wherein the enclosure comprises a top cover and a base configured to house the printed circuit board and substantially protect the temperature sensing element.

12. The method to accurately read temperature for a room sensor apparatus of claim 11, wherein the isolating wall is a molded portion of the top cover.

13. The method to accurately read temperature for a room sensor apparatus of claim 9, wherein the slot is a conductive barrier.

14. The method to accurately read temperature for a room sensor apparatus of claim 13, wherein the conductive barrier establishes a conductive path to decrease the heat transfer between the printed circuit board and the temperature sensing element.

* * * * *